US005495281A

United States Patent [19]

Nashida et al.

[11] Patent Number: 5,495,281

[45] Date of Patent: Feb. 27, 1996

[54] LASER BEAM SCANNING APPARATUS HAVING LASER BEAM UNIT PROVIDED DIRECTLY ON PRINTED CIRCUIT CONTROL BOARD

[75] Inventors: Yasumasa Nashida, Yokohama; Hiroshi Hashimoto; Masanori Ishizu, both of Tokyo; Toshihiko Inuyama, Fujisawa; Junichi Kimizuka, Yokohama, all of Japan

[73] Assignee: Canon Kabushiki Kaisha, Tokyo, Japan

[21] Appl. No.: 158,497

[22] Filed: Nov. 29, 1993

Related U.S. Application Data

[63] Continuation of Ser. No. 646,285, Jan. 28, 1991, abandoned.

[30] Foreign Application Priority Data

Jan. 30, 1990 [JP] Japan .................................... 2-019745

[51] Int. Cl.⁶ ........................................ G01D 9/42

[52] U.S. Cl. ........................ 347/263; 347/224; 347/225

[58] Field of Search ........................ 346/108, 153.1, 346/147, 160, 76 L; 358/300; 347/263, 256, 257, 224, 225

[56] References Cited

U.S. PATENT DOCUMENTS

| | | | |
|---|---|---|---|
| 4,297,713 | 10/1981 | Ichikawa et al. | 346/108 |
| 4,841,311 | 6/1989 | Suzuki et al. | 346/108 |
| 4,952,946 | 8/1990 | Clark et al. | 346/108 |
| 4,977,412 | 12/1990 | Komori et al. | 346/108 |
| 5,041,848 | 8/1991 | Gilbert et al. | 346/108 |

FOREIGN PATENT DOCUMENTS

| | | |
|---|---|---|
| 62-177517 | 8/1987 | Japan . |
| 1-181020 | 12/1989 | Japan . |

*Primary Examiner*—R. L. Moses

*Attorney, Agent, or Firm*—Fitzpatrick, Cella, Harper & Scinto

[57] ABSTRACT

The present invention provides a laser beam scanning apparatus comprising a laser unit for emitting a laser beam, and a print circuit board having control means for controlling ON/OFF of the laser unit. The laser unit is provided directly on the print circuit board.

42 Claims, 6 Drawing Sheets

LASER BEAM SCANNING APPARATUS HAVING LASER BEAM UNIT PROVIDED DIRECTLY ON PRINTED CIRCUIT CONTROL BOARD

This application is a continuation of application Ser. No. 07/646,285 filed Jan. 28, 1991, now abandoned.

BACKGROUND OF THE INVENTION

1. Field of the Invention

The present invention relates to a laser beam scanning apparatus for controlling the driving of a scanning unit including a laser unit by means of a control means provided on a print circuit board.

2. Related Background Art

An example of an image forming system using the laser beam scanning will be explained. FIG. 1 shows a block diagram of a laser beam printer embodying an image forming system.

Explaining each of the blocks, a scanning unit 104 is constituted by a laser unit 120, a detecting element 131 for detecting a horizontal synchronous signal for determining a scanning start position of the laser, a lens 121 for focusing a light beam 132 from the laser unit 120 onto an image bearing member 117, a reflection mirror 122 for directing the light beam 132 to the image bearing member and the like.

The reference numeral 109 denotes a toner image forming unit and a transfer unit for forming a toner image in response to image information and for transferring the toner image onto a recording sheet S.

More particularly, around a photosensitive member 117 acting as the image bearing member, there are disposed a pre-exposure lamp 115, a primary charger 114, a developing device 113 including toner therein, a transfer charger 112 and a cleaner 116; and, in response to the light beam 132 from the scanning unit 104, the toner image is formed on the image bearing member 117 and the toner image is transferred onto the recording material such as a sheet.

A fixing unit 106 serves to thermally fix the toner image on the recording sheet S by passing the latter between a heat roller 119 and a pressure roller 130.

A conveying unit 105 serves to separate the recording sheet S one by one from a sheet stack contained in a cassette 129 by means of a supply roller 110 and convey the recording sheet separated in a timed relation with the image timing to a pair of regist rollers 111 and then convey the recording sheet on which the toner image is transferred through the transfer charger 112 to the fixing unit 106.

Next, the relation between the blocks will be explained.

When signals for forming the image are sent to an image control unit 100 and a sequence control unit 103 through an interface 123 from a host computer 102 which is an external equipment acting as an image information source, these control units perform the following controls:

(i) driving the conveying unit 105 to separate and feed the recording sheet one by one;

(ii) treating the image signal inputted from the external equipment 102 and the horizontal synchronous signal from the horizontal synchronous signal detecting element 131 in the scanning unit 104, whereby the synchronized image signal is sent to the laser unit 120 and a latent image is formed on the image bearing member 117 in the toner image forming unit by illuminating the light beam 132 onto the image bearing member (now charged) in response to the image signal; and controlling a current to be flowed into the light emitting element on occasion to keep the light amount of the light beam 132 constant;

(iii) driving the developing device 113 to visualize the latent image formed on the image bearing member with the toner;

(iv) driving the toner image forming unit, transfer unit 109 and conveying unit 105 to transfer the toner image on the image bearing member onto the recording sheet S; incidentally, the residual toner remaining on the image bearing member from which the toner image has been transferred is removed from the image bearing member by means of the cleaner 116; and (v) driving the fixing unit 106, thereby thermally fixing the toner image onto the recording sheet S conveyed from the transfer unit, thus finishing the image formation.

By the way, the above-mentioned various units (104, 109,105, 106) are disposed at predetermined locations in the scanning apparatus for functional and constructural reasons. Consequently, the control units 100, 103 were connnected to the various units via relatively long electrical signal distributing cables to permit the communication therebetween.

However, if the control units 100, 103 were arranged remote from the scanning unit 104 and these were interconnected through the signal distributing cables, the following disadvantage arose. That is to say, the signals emitted from and sent to the scanning unit directly relate to the image formation and are extremely high speed image signals. Thus, if the communication of such high speed image signals between the control units and the scanning unit was effected through the relatively long signal distributing cables, there arose a problem that the image signals were not properly transmitted due to the noise entering into the cables and the noise emitted externally from the cables, thus preventing the proper image formation.

To solve this problem, a method for shielding the signal distributing cables or a method for inserting a ferrite core in the cable has been adopted; however, these methods make the apparatus very expensive. Further, there is the limitation in preventing the noise, and, regarding the electric signal having a high frequency for obtaining the high resolving power, it was very difficult to prevent the noise.

SUMMARY OF THE INVENTION

An object of the present invention is to provide a laser beam scanning apparatus which is hard to be influenced by the noise.

Another object of the present invention is to provide a laser beam scanning apparatus including a laser unit disposed on a print circuit board having a control means for drivingly controlling ON/OFF of the laser unit.

A further object of the present invention is to provide a laser beam scanning apparatus wherein a control means for drivingly controlling ON/OFF of a laser unit is disposed in confronting relation to the laser unit.

A still further object of the present invention is to provide an image forming system wherein a control unit for controlling the operation of the image forming system is attached to a scanning unit having a laser unit.

Other object of the present invention will be apparent from the following description referring to the accompanying drawings.

DETAILED DESCRIPTION OF THE PREFERRED EMBODIMENT

The present invention will now be explained in connection with embodiments thereof with reference to the accompanying drawings.

Figure 2:
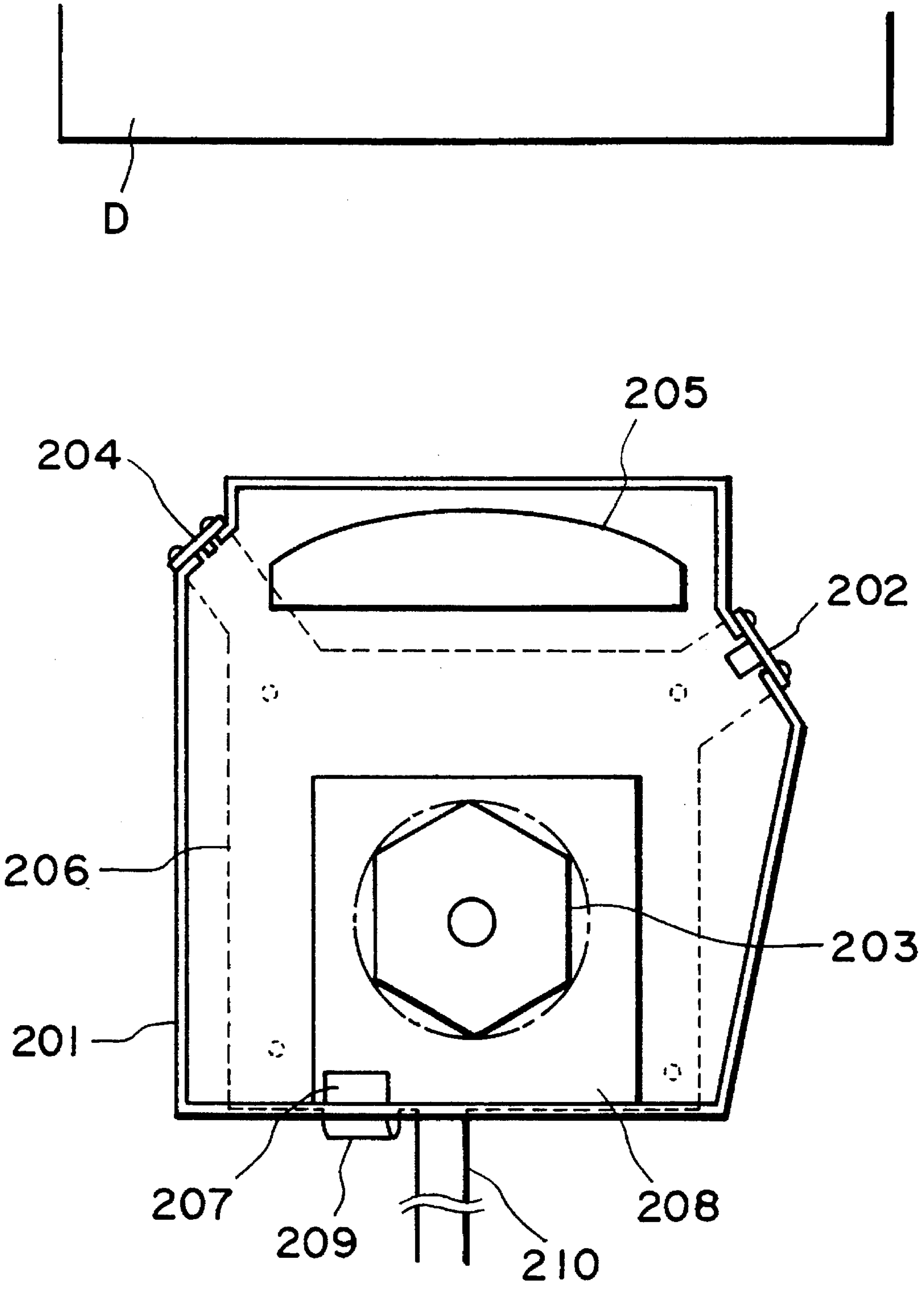
FIG. 2 is a plan view of a laser beam scanning apparatus according to a preferred embodiment of the present invention.
Figure 3:
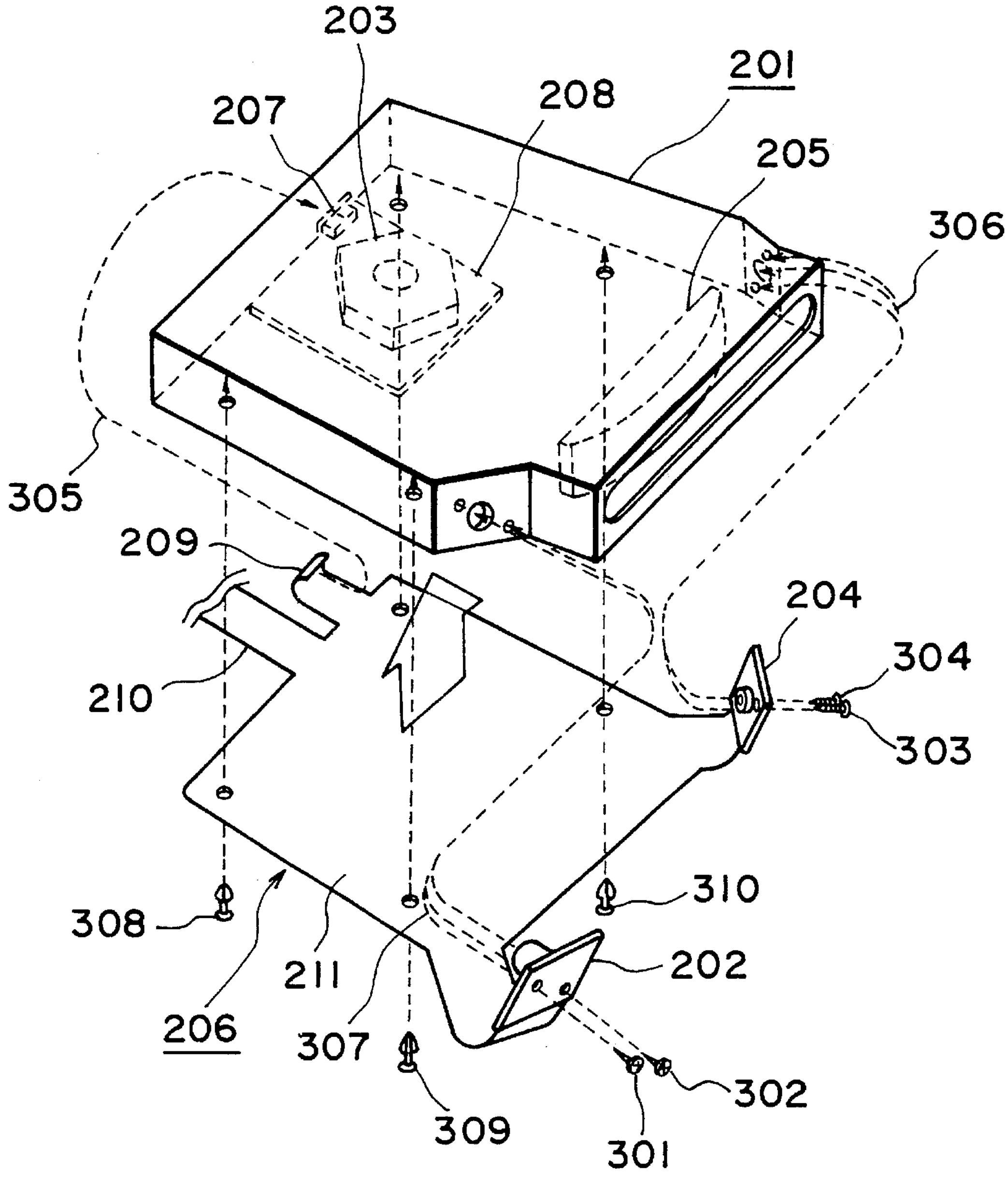
FIG. 3 is an exploded perspective view of the apparatus of FIG. 1.

FIGS. 2 and 3 show a laser beam scanning apparatus according to a preferred embodiment of the present invention, wherein FIG. 2 is a plan view of a scanning unit and a control unit after they are assembled together and FIG. 3 is an exploded perspective view of such units before they are assembled.

The laser beam scanning apparatus is constituted as follows:

A print circuit board (PBC) 202 includes a laser unit having a semi-conductor laser, a modulator circuit for modulating an image signal to a laser beam, and an APC (auto power control) circuit for keeping a light amount of the laser beam constant.

The reference numeral 203 denotes a polygonal mirror acting as a deflector means for scanning the light beam from the semi-conductor laser in a horizontal direction; and 208 denotes a PCB on which a motor and a driving circuit for rotating the polygonal mirror at a constant speed are mounted. A PCB 204 includes a photo-detector for detecting a horizontal synchronous signal from the light beam, a detecting circuit and a signal treatment circuit, so as to determine an illumination start position of the light beam scanned by the polygonal mirror on an image bearing member D. The reference numeral 205 denotes a focusing lens for focusing the light beam scanned by the polygonal mirror onto the image bearing member (photosensitive member).

On a flexible board 211 (referred to as "FPC" hereinafter) of a control unit 206 for controlling the image forming system, there are disposed a CPU (central processing unit) and circuit elements such as memories (ROM, RAM and the like) to constitute a control circuit. After the CPU receives the signal regarding the image from the host computer, it derives the data from the ROM and/or RAM, and controls means for forming the image (charger means, exposure means, developing means and the like) on the basis of such data. The control unit 206 also has both functions of the image control unit 100 and of the sequence control unit 103 as shown in FIG. 1 and includes a laser driving circuit for driving the semi-conductor laser on the basis of the signal from the host computer.

Figure 1:
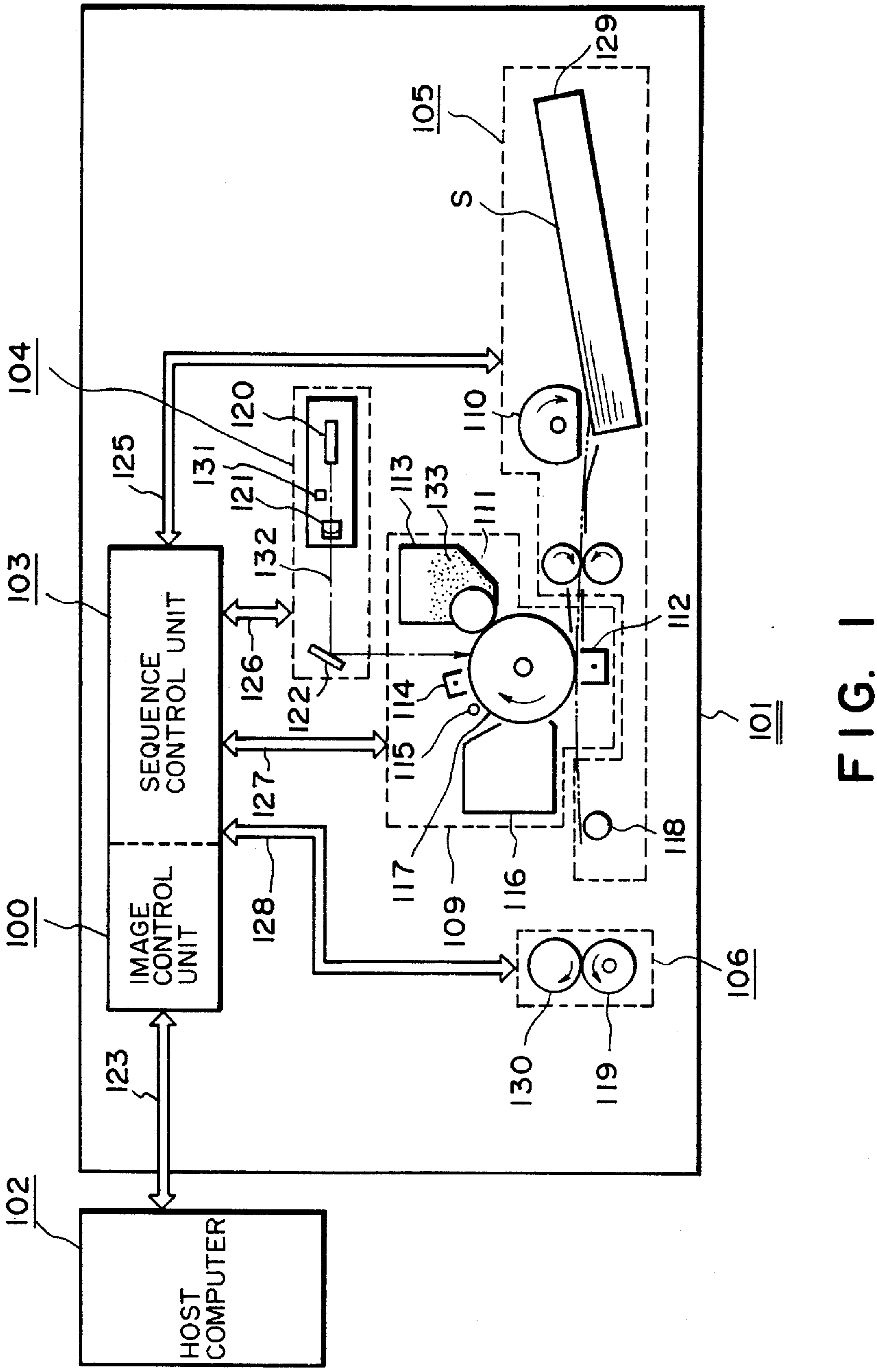
FIG. 1 is a block diagram of a laser beam printer acting as an image forming system.

The control unit 206 receives the electric power from an electric power unit (not shown) via a FPC wiring 210, and the FPC wiring 210 is connected to the conveying unit 105, toner image forming unit, transfer unit 109 and fixing unit 106 as shown in FIG. 1 to control these units.

Further, the FPC 211 includes a PCB on which a semi-conductor laser, modulator circuit and APC circuit are mounted. The PCB 202 is mounted on the control circuit of the FPC 211, which control circuit controls the image signal and a UNBL signal (unblanking signal) detected from the horizontal synchronous signal to determine ON/OFF of the laser unit. Further, the PCB 204 including the photodetector for detecting the horizontal synchronous signal, detection circuit and signal treatment circuit acting as a wave-form shaping circuit is also mounted on the FPC 211. The PCB 204 is mounted on the control circuit of the FPC 211, which control circuit generates the UNBL signal used for controlling ON/OFF of the laser unit.

A FPC wiring 209 constituting a part of the control unit 206 is connected, via a connector 207, to the PCB 208 on which the polygonal mirror driving motor and the driving circuit are mounted.

In this way, various elements to be attached to the scanning unit are mounted on the FPC, it is possible to omit the electric wiring cable for the communication of the high speed image signal between the scanning unit and the control unit. Thus, it is possible to increase the anti-noise (entering noise and radiating noise) due to the wiring between the scanning unit and the control unit, with the result that the image signal can easily be treated at the high frequency.

Further, in assembling the units, since the dispersion in the semi-conductor elements and the dispersion in the efficiency of the optical system can be adjusted by the control unit alone, the adjustment during the assembling operation is not needed, thus improving the assembling operability.

Further, in the illustrated embodiment, the FPC 211 is fixedly attached to the underside of the scanning unit 201 by means of pins 308–310, and the PCB 202 is positioned with respect to the scanning unit 201 and is fixed to the latter by means of screws 301, 302 passing through positioning openings formed in the PCB and corresponding positioning openings formed in the scanning unit as shown by the broken lines 307. Similarly, the PCB 204 is also positioned with respect to the scanning unit 201 and is fixed to the latter by means of screws 303,304 passing through positioning openings formed in the PCB and corresponding positioning openings formed in the scanning unit as shown by the broken lines 306.

In this way, in the illustrated embodiment, since the control unit can be attached to the underside of the scanning unit, it is easily possible to make the apparatus small-sized.

Next, another embodiment of the present invention will be explained.

Figure 4:
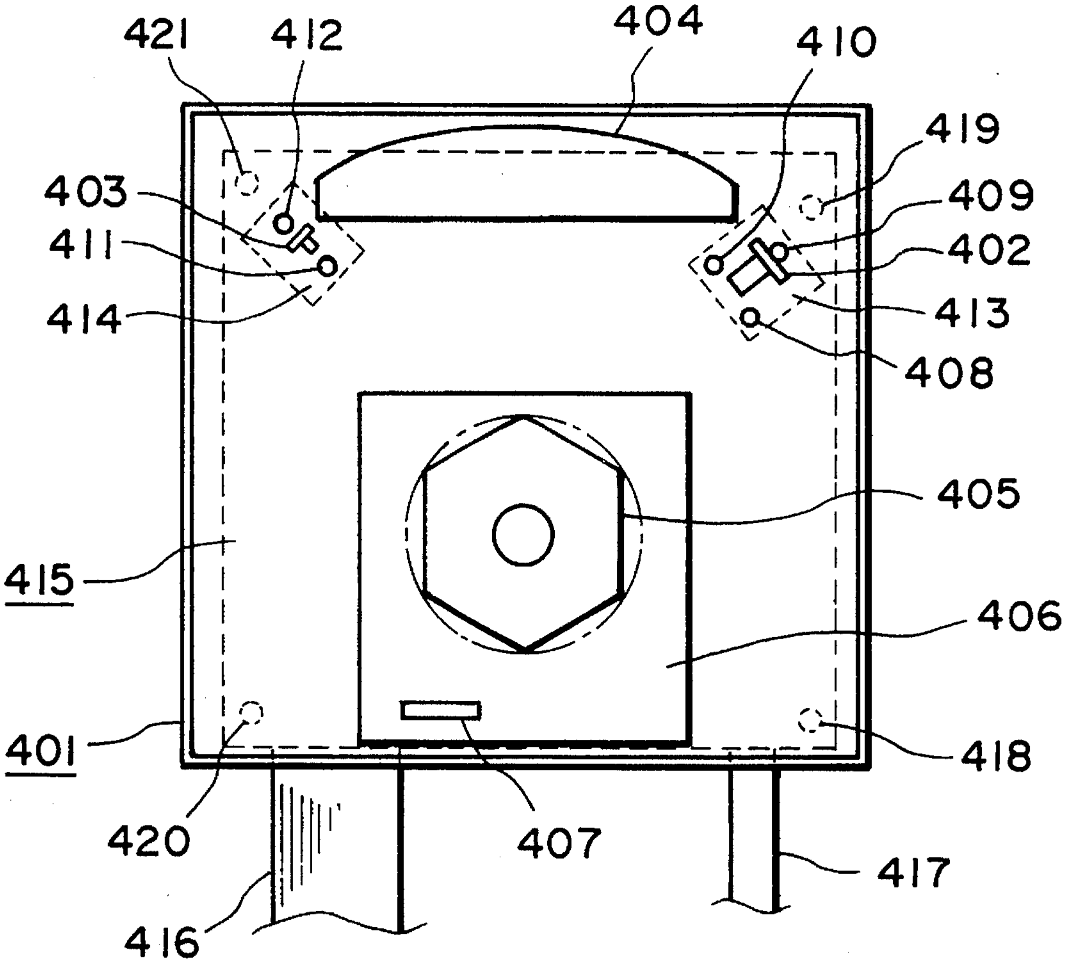
FIG. 4 is a plan view of a laser beam scanning apparatus according to another embodiment of the present invention.
Figure 5:
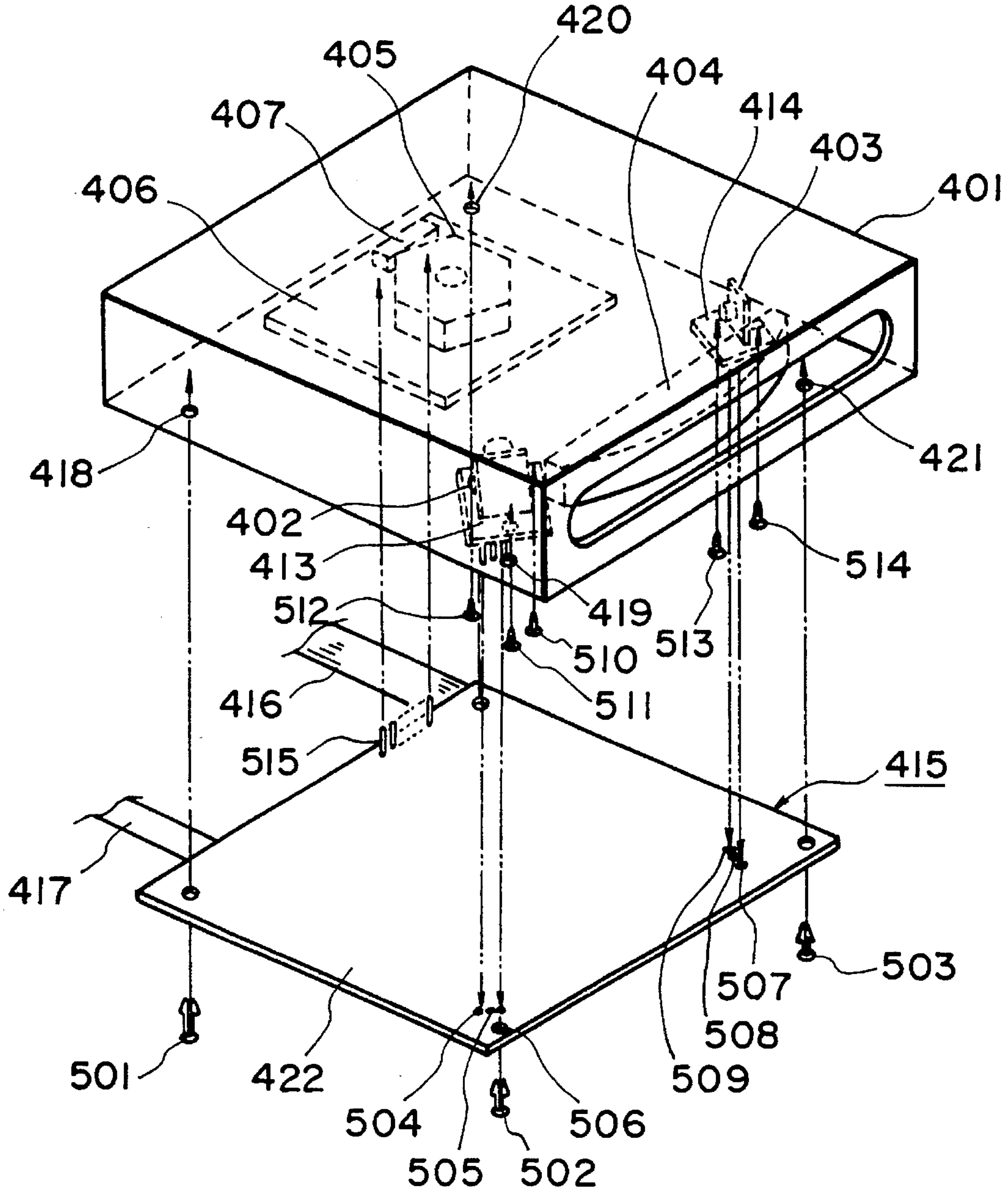
FIG. 5 is an exploded perspective view of the apparatus of FIG. 4.

FIGS. 4 and 5 show a laser beam scanning apparatus according to another embodiment of the present invention.

In the above-mentioned embodiment, while an example that the circuit elements of the control unit are constituted on the FPC and the semi-conductor laser and the photodetector are mounted on the same FPC and the FPC is attached to the scanning unit was explained, in this embodiment shown in FIGS. 4 and 5, the circuit elements of the control unit are mounted on the PCB.

In FIGS. 4 and 5, the laser beam scanning apparatus is constituted as follows:

The reference numeral 402 denotes a semi-conductor laser; 405 denotes a polygonal mirror for scanning the light beam from the semi-conductor laser in a horizontal direction; 406 denotes a PCB on which a motor and a driving circuit for rotating the polygonal mirror at a constant speed are mounted; 403 denotes a photodetector for detecting a horizontal synchronous signal from the light beam scanned by the polygonal mirror; and 404 denotes a focusing lens for focusing the light beam scanned by the polygonal mirror onto the image bearing member.

A PCB 413 (corresponding to the PCB 202 in FIG. 3) to which the semi-conductor laser 402 has already attached is fixed to a scanning unit 401 by screws 510–512 passing through positioning openings formed in the PCB. Further, a PCB 414 (corresponding to the PCB 204 in FIG. 3) to which the photodetector 403 is attached is also fixed to the scanning unit 401 by screws 513,514 passing through positioning openings 411, 412 formed in the PCB.

In a control unit 415, circuit elements such as CPU and the like are disposed on a PCB 422 (back side of the PCB in FIG. 5) to constitute a control circuit. The control unit 415 is fixedly mounted on the underside of the scanning unit 401 by pins 501–503.

A control circuit for controlling ON/OFF of the laser unit is mounted on the PCB 422 of the control unit 415 in confronting relation to the PCB 413, and a circuit for forming a UNBL signal is also mounted on the PCB 422 in confronting relation to the PCB 414.

That is to say, the terminals of the PCB 413 having the semi-conductor laser 402 positioned on the scanning unit 401 and the terminals of the PCB 414 having the photodetector 403 are electrically connected directly to terminals 504–506 and 507–509 constituted by through holes or connectors, respectively, without using cables.

The control unit 415 is connected, via a connector, to the PCB 406 on which the motor and the driving circuit for driving the polygonal mirror. Further, the control unit 415 receives the electric power from an electric power unit (not shown) via a wiring 417, and a wiring 416 is connected to a conveying unit, toner image forming unit, transfer unit and fixing unit as shown in FIG. 1 to control these units.

Incidentally, an input signal from the host computer acting as the image information source is inputted to the control unit via the wiring 416.

As mentioned above, in this embodiment, by connecting the scanning unit and the control unit without using any cables, it is possible to reduce the influence due to the noise in the same manner as the previous embodiment.

Further, since the electric signal distributing cables between the scanning unit and the control unit can be omitted in the apparatus, any connectors for the connection with the signal distributing cables are not needed, thus preventing the poor electrical contact to improve the reliability.

Incidentally, in the second embodiment, while an example that the semi-conductor laser and the modulator circuit and APC circuit are integrally assembled and are mounted on the scanning unit was explained, only the semi-conductor laser may be disposed on the scanning unit, and the modulator circuit and APC circuit may be mounted on the PCB of the control unit. That is to say, there is no problem so long as the laser driving unit for activating the laser is connected to the laser unit without using any cable.

Figure 6:
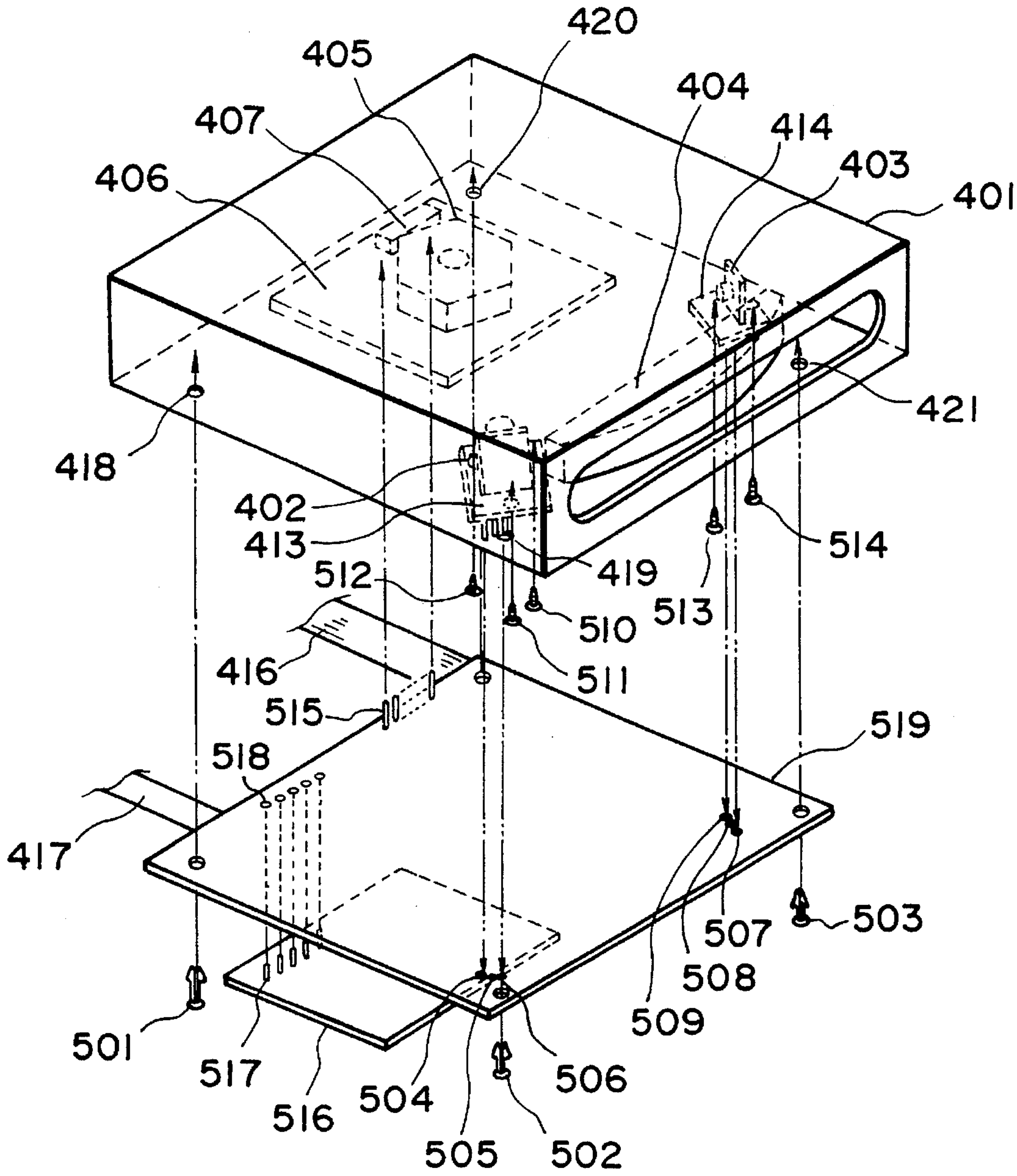
FIG. 6 is an exploded perspective view of a laser beam scanning apparatus according to a further embodiment of the present invention.

FIG. 6 shows a further embodiment of the present invention. The elements having the same functions as those shown in FIG. 5 will be designated by the same reference numerals.

In the embodiment illustrated in FIGS. 4 and 5, while the control unit 415 had a single PCB, in the embodiment shown in FIG. 6, the control unit has two or more PCB's.

In the illustrated embodiment, circuits for driving the laser relating to high frequency signals are mounted on a print circuit board 519, and circuits for the sequence not relating to the other high frequency signals are mounted on a print circuit board 516. The two print circuit boards 519, 516 are connected with each other substantially directly without using any signal distributing cables. If there is no communication of the high frequency signals between these two print circuit boards, these boards can be connected with each other via cables.

In this way, even when the control unit having two print circuit boards is attached to the scanning unit, it is possible to reduce the influence due to the noise in the same manner as the previous embodiments.

Incidentally, the laser beam scanning apparatus illustrated in the above embodiments can be applied to various kinds of image forming systems wherein the photosensitive member is scanned by the laser beam, such as a printer, copying machine, facsimile and the like.

As mentioned, while the present invention was explained with reference to specific embodiments, the present invention is not limited to such embodiments, but various alternations and modifications can be adopted without departing from the scope of the invention.

What is claimed is:

1. An image forming apparatus, comprising:

a photosensitive body;

charging means for charging said photosensitive body;

a laser unit for emitting a laser beam;

deflection means for rotatively deflecting the laser beam emitted from said laser unit;

a scan unit which includes said laser unit and said deflection means, said scan unit for emitting the deflected laser beam;

developing means for developing a latent image on said photosensitive body; and a circuit board provided with control means for controlling said charging means, said laser unit, said deflection means and said developing means, said circuit board being fixed to said scan unit.

2. An image forming apparatus according to claim 1, wherein said circuit board is fixed to a bottom surface of said scan unit.

3. An image forming apparatus according to claim 1, wherein said control means controls image formation means for forming the image onto said photosensitive body.

4. An image forming apparatus according to claim 1, wherein said control means has a CPU.

5. An image forming apparatus, comprising:

a photosensitive body;

a laser unit for emitting a laser beam;

deflection means for rotatively deflecting the laser beam emitted from said laser unit;

a scan unit which includes said laser unit and said deflection means, said scan unit for emitting the deflected laser beam;

said photosensitive body, while in a charged condition, being exposed and scanned by the laser beam emitted from said scan unit to form a latent image, which latent image is developed and the developed image being transferred to a recording medium and fixed thereon; and a circuit board provided with control means for controlling said image forming apparatus, said circuit board being fixed to said scan unit;

wherein said control means controls convey means for conveying the recording medium.

6. An image forming apparatus, comprising:

a photosensitive body;

a laser unit for emitting a laser beam;

deflection means for rotatively deflecting the laser beam emitted from said laser unit;

a scan unit which includes said laser unit and said deflection means, said scan unit for emitting the deflected laser beam;

said photosensitive body, while in a charged condition, being exposed and scanned by the laser beam emitted from said scan unit to form a latent image, which latent image is developed, and the developed image being transferred to a recording medium and fixed thereon; and a circuit board provided with control means for controlling said image forming apparatus, said circuit board being fixed to said scan unit, wherein said control means controls transfer means for transferring the developed image of said photosensitive body.

7. An image forming apparatus, comprising:

a photosensitive body;

a laser unit for emitting a laser beam;

deflection means for rotatively deflecting the laser beam emitted from said laser unit;

a scan unit which includes said laser unit and said deflection means, said scan unit for emitting the deflected laser beam;

said photosensitive body, while in a charged condition, being exposed and scanned by the laser beam emitted from said scan unit to form a latent image, which latent image is developed, and the developed image being transferred to a recording medium and fixed thereon; and a circuit board provided with control means for controlling said image forming apparatus, said circuit board being fixed to said scan unit, wherein said control means controls fixing means for fixing the image on the recording medium.

8. An image forming apparatus, comprising:

a photosensitive body;

charging means for charging said photosensitive means;

a laser unit for emitting a laser beam;

deflection means for rotatively deflecting the laser beam emitted from said laser unit;

a scan unit which includes said laser unit and said deflection means, said scan unit for emitting the deflected laser beam;

developing means for developing a latent image on said photosensitive body; and a circuit board provided with control means for controlling said charging means, said laser unit, said deflection means and said developing means, said laser unit being mounted on said circuit board.

9. An image forming apparatus according to claim 8, wherein said circuit board is fixed to said scan unit.

10. An image forming apparatus according to claim 9, wherein said circuit board is fixed onto a bottom surface of said scan unit.

11. An image forming apparatus according to claim 9, wherein said circuit board is a flexible board which is bent when fixing said laser unit to said scan unit.

12. An image forming apparatus according to claim 8, further comprising detection means for detecting position of the laser beam deflected at said deflection means in order to determine a start position for writing of the laser beam on said photosensitive body, said detection means being mounted on said circuit board.

13. An image forming apparatus according to claim 12, wherein said circuit board is a flexible board which is bent to fix said circuit board and said detection means to said scan unit.

14. An image forming apparatus according to claim 12, wherein said detection means has a detection circuit board on which a photodetector, detection circuit and wave reforming circuit are mounted.

15. An image forming apparatus according to claim 8, wherein said circuit board includes means for modulating image information to the laser beam.

16. An image forming apparatus according to claim 8, wherein said circuit board has an Auto Power Control (APC) circuit board for keeping light amount of the laser beam emitted from said laser unit constant.

17. An image forming apparatus according to claim 8, wherein said control means controls image formation means for forming the image onto said photosensitive body.

18. An image forming apparatus according to claim 8, wherein said control means controls convey means for conveying the recording medium.

19. An image forming apparatus according to claim 8, wherein said control means controls transfer means for transferring the developed image of said photosensitive body.

20. An image forming apparatus according to claim 8, wherein said control means controls fixing means for fixing the image on the recording medium.

21. An image forming apparatus according to claim 8, wherein said control means has a CPU.

22. A laser beam scanning apparatus, comprising:

a laser unit for emitting a laser beam;

deflection means for scanningly deflecting the laser beam emitted from said laser unit;

a scan unit which includes said laser unit and said deflection means, said scan unit for emitting the deflected laser beam; and a circuit board provided with control means for controlling said laser unit and said deflection means, said circuit board having a first connecting portion for electrical connection to a connecting portion of said laser unit and a second connecting portion for electrical connection to a connecting portion of said deflection means, wherein a positional relation between the first and second connecting portions of said circuit board is the same as a positional relation between the connecting portion of said laser unit in said scan unit and the connecting portion of said deflection means in said scan unit.

23. A laser beam scanning apparatus according to claim 22, wherein said circuit board is fixed to said scan unit.

24. A laser beam scanning apparatus according to claim 23, wherein said circuit board is fixed onto a bottom surface of said scan unit.

25. A laser beam scanning apparatus according to claim 22, wherein said circuit board includes means for modulating image information to the laser beam.

26. A laser beam scanning apparatus according to claim 22, wherein said control means controls image formation means forming the image onto said photosensitive body.

27. A laser beam scanning apparatus according to claim 22, further comprising detection means for detecting position of the laser beam deflected at said deflection means in order to determine a starting position for writing of the laser beam on a photosensitive body, said detection means being mounted on said scan unit.

28. A laser beam scanning apparatus according to claim 27, wherein said circuit board has, at a position corresponding to the position of said detection means, a connecting portion for electrical connection to said detection means.

29. A laser beam scanning apparatus according to claim 27, wherein said detection means has a detection circuit board on which a photodetector, detection circuit and wave reforming circuit are mounted.

30. A laser beam scanning apparatus according to claim 22, wherein said control means has a CPU.

31. An image forming apparatus, comprising:

a photosensitive body;

a laser unit for emitting a laser beam;

deflection means for rotatively deflecting the laser beam emitted from said laser unit;

a scan unit which includes said laser unit and said deflection means, said scan unit for emitting the deflected laser beam;

said photosensitive body, while in a charged condition, being exposed and scanned by the laser beam emitted from said scan unit to form a latent image, which latent image is developed and the developed image being transferred to a recording medium and fixed thereon; and a circuit board provided with control means for controlling said image forming apparatus, said circuit board having, at positions corresponding to positions of said laser unit and said deflection means in said scan unit, connecting portions for electrical connection to said laser unit and said deflection means, wherein said circuit board has an Auto Power Control (APC) circuit for keeping light amount of the laser beam emitted from said laser unit constant.

32. An image forming apparatus, comprising:

a photosensitive body;

a laser unit for emitting a laser beam;

deflection means for rotatively deflecting the laser beam emitted from said laser unit;

a scan unit which includes said laser unit and said deflection means, said scan unit for emitting the deflected laser beam;

said photosensitive body, while in a charged condition, being exposed and scanned by the laser beam emitted from said scan unit to form a latent image, which latent image is developed, and the developed image being transferred to a recording medium and fixed thereon; and a circuit board provided with control means for controlling said image forming apparatus, said circuit board having, at positions corresponding to positions of said laser unit and said deflection means in said scan unit, connecting portions for electrical connection to said laser unit and said deflection means, wherein said control means controls convey means for conveying the recording medium.

33. An image forming apparatus, comprising:

a photosensitive body;

a laser unit for emitting a laser beam;

deflection means for rotatively deflecting the laser beam emitted from said laser unit;

a scan unit which includes said laser unit and said deflection means, said scan unit for emitting the deflected laser beam;

said photosensitive body, while in a charged condition, being exposed and scanned by the laser beam emitted from said scan unit to form a latent image, which latent image is developed, and the developed image being transferred to a recording medium and fixed thereon; and a circuit board provided with control means for controlling said image forming apparatus, said circuit board having, at positions corresponding to positions of said laser unit and said deflection means in said scan unit, connecting portions for electrical connection to said laser unit and said deflection means, wherein said control means controls transfer means for transferring the developed image on said photosensitive body.

34. An image forming apparatus, comprising:

a photosensitive body;

a laser unit for emitting a laser beam;

deflection means for rotatively deflecting the laser beam emitted from said laser unit;

a scan unit which includes said laser unit and said deflection means, said scan unit for emitting the deflected laser beam;

said photosensitive body, while in a charged condition, being exposed and scanned by the laser beam emitted from said scan unit to form a latent image, which latent image is developed, and the developed image being transferred to a recording medium and fixed thereon; and a circuit board provided with control means for controlling said image forming apparatus, said circuit board having, at positions corresponding to positions of said laser unit and said deflection means in said scan unit connecting portions for electrical connection to said laser unit and said deflection means, wherein said control means controls fixing means for fixing the image on the recording medium.

35. A laser beam scanning apparatus, comprising:

a laser unit for emitting a laser beam;

deflection means for rotatively deflecting the laser beam emitted from said laser unit;

a scan unit including said deflection means and emitting the laser beam deflected by said deflection means; and a circuit board on which said laser unit is mounted, said circuit board being fixed to said scan unit, wherein said circuit board is a flexible board, and the board is bent, whereby said laser unit is fixed to said scan unit.

36. An apparatus according to claim 35, wherein said circuit board is provided with control means for controlling the apparatus.

37. A laser beam scanning apparatus, comprising:

a laser unit for emitting a laser beam;

deflection means for rotatively deflecting the laser beam emitted from said laser unit;

detection means for detecting a position of the laser beam deflected by said deflection means;

a scan unit including said deflection means and emitting the laser beam deflected by said deflection means; and a circuit board on which said detection means is mounted, said circuit board being fixed to said scan unit, wherein said circuit board is a flexible board, and the board is bent, whereby said detection means is fixed to said scan unit.

38. An apparatus according to claim 37, wherein said circuit board is provided with control means for controlling the apparatus.

39. A laser beam scanning apparatus, comprising:

a laser unit for emitting a laser beam;

deflection means for rotatively deflecting the laser beam emitted from said laser unit;

detection means for detecting a position of the laser beam deflected by said deflection means;

a scan unit including said deflection means and emitting the laser beam deflected by said deflection means; and a circuit board on which said laser unit and said detection means are mounted, said circuit board being fixed to said scan unit.

40. An apparatus according to claim 39, wherein said circuit board is a flexible board, and the board is bent, whereby said laser unit and said detection means are fixed to said scan unit.

41. An apparatus according to claim 39, wherein said circuit board is provided with control means for controlling the apparatus.

42. A laser beam scanning apparatus, comprising:

a laser unit for emitting a laser beam;

deflection means for rotatively deflecting the laser beam emitted from said laser unit; and detection means for detecting a position of the laser beam deflected by said deflection means, wherein said laser unit and said detection means are mounted on the same circuit board.

* * * * *